(12) United States Patent
Coon

(10) Patent No.: US 6,970,328 B1
(45) Date of Patent: Nov. 29, 2005

(54) LOW STIFFNESS, HIGH TORSION SUSPENSION

(75) Inventor: Warren Coon, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 10/889,605

(22) Filed: Jul. 12, 2004

Related U.S. Application Data

(63) Continuation of application No. 09/904,972, filed on Jul. 21, 2001, now Pat. No. 6,768,613.

(60) Provisional application No. 60/298,524, filed on Jun. 15, 2001, provisional application No. 60/292,119, filed on May 18, 2001.

(51) Int. Cl.[7] ............................................. G11B 5/596
(52) U.S. Cl. .............................. 360/245.9; 360/244.3; 360/244.8
(58) Field of Search ........................ 360/245.9, 244.8, 360/244.1, 244.3

(56) References Cited

U.S. PATENT DOCUMENTS

| 5,612,840 A | 3/1997 | Hiraoka et al. .......... 360/245.9 |
| 6,768,613 B1 | 7/2004 | Coon ...................... 360/245.9 |

*Primary Examiner*—Robert S. Tupper
(74) *Attorney, Agent, or Firm*—Louis J. Bachand

(57) ABSTRACT

A low stiffness, high torsion disk drive suspension having reduced gram load change after backbending and method includes a laminate of a plastic film layer and a plurality of conductors in which the spring portion, the base portion and/or the distal portion are provided with contiguous discontinuities that reduce the vertical stiffness of the suspension with only a low reduction in torsion, and that limit gram load changes by preventing stretching of the plastic film that would otherwise accompany backbending of the suspension.

11 Claims, 5 Drawing Sheets

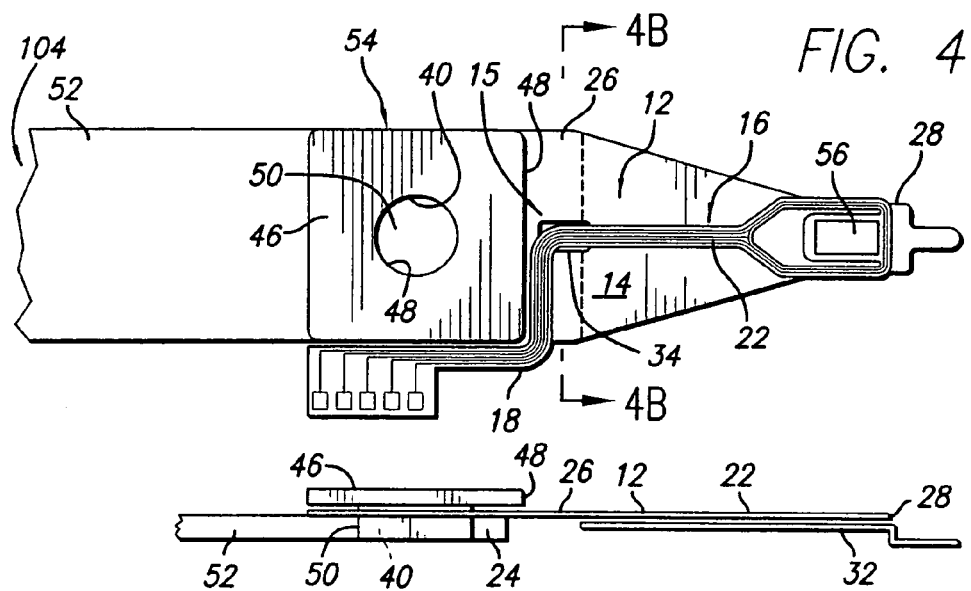
FIG. 4
FIG. 4A
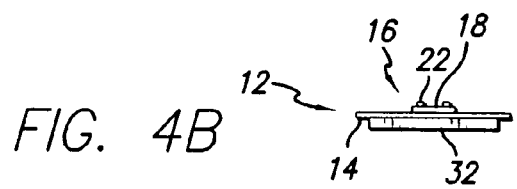
FIG. 4B
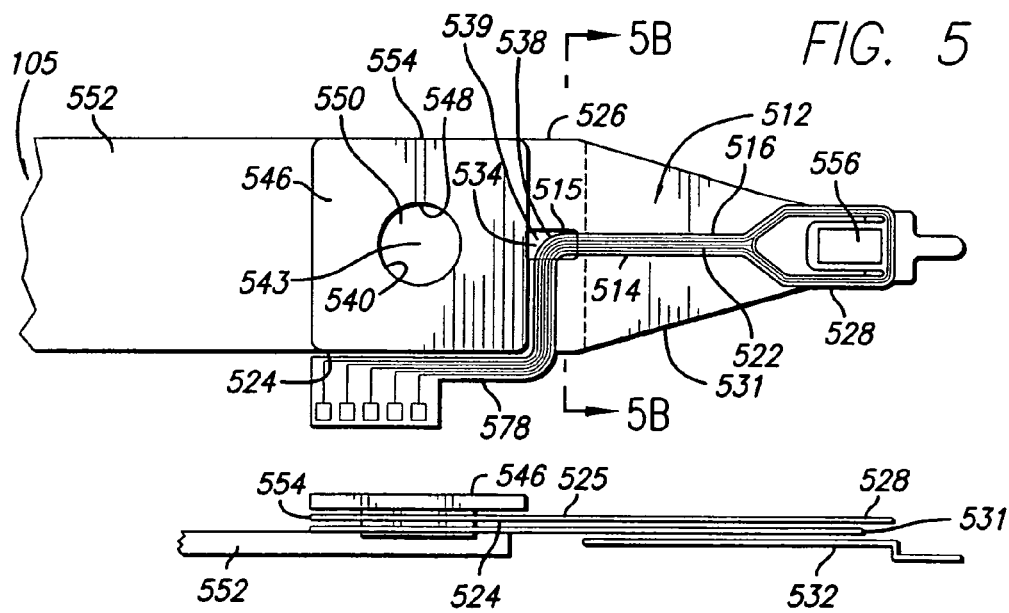
FIG. 5
FIG. 5A
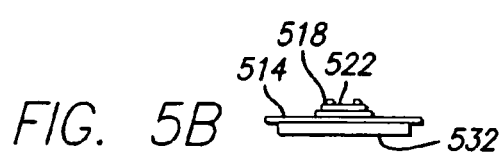
FIG. 5B

US 6,970,328 B1

LOW STIFFNESS, HIGH TORSION SUSPENSION

CROSS-REFERENCE TO RELATED APPLICATIONS

This application is a continuation of U.S. patent application Ser. No. 09/904,972, filed Jul. 21, 2001 now U.S. Pat. No. 6,768,613, which application claims the benefit of U.S. Provisional Application Ser. No. 60/292,119, filed May 18, 2001, and Ser. No. 60/298,524, filed Jun. 15, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and more particularly to achieving lower vertical stiffness values in a suspension while retaining in large part the torsion properties normally thought to be compromised by decreasing suspension stiffness. In a further aspect, the invention provides for the retention of intended gram load values of the suspension despite backbending of the suspension that may occur during head stack assembly, combing or other mechanical operations that cause the suspension to be bent, even briefly, along its longitudinal axis. In general, these results are realized by removing selected metal layer material from the suspension in the spring portion and in the distal portion as well. Sway resonant frequency is also improved with the invention.

2. Description of the Related Art

Each suspension application has a vertical stiffness requirement. Selection of suspension spring portion length, thickness width, within the overall size limitations imposed by the application determines the vertical stiffness, with increased width associated with increased stiffness. In general, vertical stiffness is desirably minimized. Torsional frequency response of a suspension, a function of torsion stiffness, herein generally called simply torsion, is desirably maximized and this can be done by increasing the width of the spring portion, within limits imposed by the application and the need to keep stiffness low. There is thus a trade-off between stiffness and torsion that is generally resolved by using a wide spring portion and having a hole in the center thereof to reduce the volume of metal and keep width or lateral extent up.

BRIEF SUMMARY OF THE INVENTION

There is a continuing need to lower stiffness and yet maintain adequate torsion values. Ideally, the unit loss of torsion should be minimized for units of decrease in vertical stiffness. The invention has as an object the provision of a suspension design that eliminates or greatly reduces the amount of lost torsion for each increment in stiffness reduction. It is a further object to provide reduced vertical stiffness in a suspension and little or no loss in torsion. A further object is to provide a suspension in which the change in intended gram load is minimized through the utilization of the same suspension structure that provides the better ratio of torsion loss/stiffness decrease. It is a specific object to provide a suspension in which there is an aperturing locally in the spring portion carrying on to the base and/or distal portion of the suspension that enables a decrease in suspension stiffness at little or no loss in torsion. The discontinuity further acts to allow the plastic film part of the suspension laminate to avoid stretching with the metal layer part of the laminate during backbending of the suspension by passing through the discontinuity instead of bending arcuately with the metal layer. The problem of the stretched plastic film changing the suspension intended gram load is thus avoided.

These and other objects of the invention to become apparent hereinafter are realized in low stiffness, high torsion disk drive suspension having an intended gram load and comprising a laminate of a metal layer and a subassembly comprising a plastic film layer and a plurality of conductors, the support comprising a base portion, a spring portion defined by the laminate, and a distal portion, the spring portion and either or both of the base portion and the distal portion being locally discontinuous to permit the subassembly to pass through the plane of the spring portion upon bending of the spring portion, whereby stretching of the plastic film and resultant change in intended gram load is limited.

In a further embodiment, the invention provides a suspension comprising a laminate having a proximate part and a distal part, the laminate comprising a metal layer and a subassembly comprising a plastic film layer and a plurality of conductors, and a support for said laminate, the laminate comprising a base portion, a first spring portion and a distal portion; the laminate metal layer defining a second spring portion and being locally discontinuous to permit the subassembly to pass through the plane of the second spring portion upon bending of the laminate, whereby stretching of the plastic film and resultant change in intended gram load is limited.

In a further embodiment, the invention provides a low stiffness, high torsion disk drive suspension having an intended gram load and comprising a laminate of a metal layer and a subassembly comprising a plastic film layer and a plurality of conductors, the laminate metal layer comprising a base portion, a spring portion traversed by an extent of said subassembly, and a distal portion, the metal layer being locally discontinuous opposite the subassembly extent to permit the subassembly extent to pass through the plane of the spring portion upon bending of the spring portion away from said subassembly extent, whereby stretching of the plastic film and resultant change in intended gram load are reduced from that occurring when the subassembly is bent with the spring portion and its film layer stretched.

In these embodiments, typically, the metal layer comprises stainless steel, the plastic film comprises a polyimide film, the stiffener comprises a stainless steel member of greater stiffness than the laminate metal layer, the stiffener supporting the distal portion, and typically attached to and generally congruent with the opposing part of the laminate distal portion, the discontinuity is a first discontinuity and has a longitudinal extent substantially equal to the length of the spring portion and has a lateral extent equal to about 35% to about 70% of the width or lateral extent of the spring portion, the laminate distal portion can have a second discontinuity contiguous with the first discontinuity and have a lateral extent equal to about 35% to about 70% of the width or lateral extent of the spring portion, the laminate has a base portion, the base portion defining a third discontinuity contiguous with the first discontinuity and having a lateral extent equal to about 35% to about 70% of the width of the spring portion.

In further embodiments, typically, the metal layer defines a base portion, the noted discontinuity is a first discontinuity, the laminate metal layer defining one or both of a second and third discontinuity in the laminate distal portion and the laminate base portion respectively, the discontinuities each being contiguous with the first discontinuity, each having a longitudinal extent substantially equal to the length of the spring portion, and each having a lateral extent equal to about 35% to about 70% of the width or lateral extent of the spring portion, each of the discontinuities is centered on the metal layer longitudinal axis, the subassembly being centered on the metal layer longitudinal axis and having less lateral extent than the discontinuities.

In a still further embodiment, the invention provides a low stiffness, high torsion disk drive suspension having an intended gram load and comprising a laminate having a proximate part and a distal part, the laminate comprising a metal layer and a subassembly comprising a plastic film layer and a plurality of conductors, and a laminate support, the support comprising a base portion, a spring portion, and a distal portion comprising a stiffener, the metal layer being locally discontinuous to permit the subassembly to pass through the plane of the spring portion upon bending of the laminate away from said subassembly, whereby stretching of the plastic film and resultant change in intended gram load is limited.

In this and like embodiments, the metal layer comprises stainless steel, the spring portion comprises stainless steel, the plastic film comprises a polyimide film, there can further be present a stiffener that is a stainless steel member of greater stiffness than the metal layer distal portion, the stiffener being attached to and generally congruent with the part of the metal layer distal portion it opposes, the discontinuity is a first discontinuity and has a longitudinal extent substantially equal to the longitudinal extent of the spring portion, and a lateral extent equal to about 35% to about 70% of the width of the spring portion that can be uniform or variable, e.g. the discontinuity is a first discontinuity and has a uniform lateral extent equal to about 35% to about 70% of the width of the spring portion, or the discontinuity is a first discontinuity and has a varying lateral extent over its longitudinal extent between about 35% and about 70% of the width of the spring portion, to be in this embodiment, or other embodiments herein, a closed figure of e.g. polygonal, rectangular, circular, cruciform, oval, circular, or other closed figure shape, or such shapes that open forwardly or rearwardly to the laminate proximate part or distal part.

As in previous embodiments, the laminate distal part can define a second discontinuity contiguous with the first discontinuity, the second discontinuity having a lateral extent from about 35% to about 70% of the width of the spring portion, the laminate proximate part a third discontinuity contiguous with the first discontinuity, the third discontinuity having a lateral extent from about 35% to about 70% of the width of the spring portion, or where the discontinuity is a first discontinuity, and the laminate defines one or both of a second and third discontinuity in the laminate distal part and the laminate proximate part respectively, the discontinuities each being contiguous with the first discontinuity, each having a longitudinal extent less than the longitudinal length of the spring portion, and each having a lateral extent from about 35% to about 70% of the lateral extent of the spring portion.

Typically, each of the discontinuities is centered on the metal layer longitudinal axis, the subassembly being centered on the metal layer longitudinal axis and having less lateral extent than the discontinuities, and the stiffener opposes the second discontinuity.

In a further embodiment, the invention provides a disk drive suspension for mounting by a mounting plate having a distal edge, and comprising a laminate of a metal layer and a subassembly of a plastic film layer and a plurality of conductors separated from the metal layer by the plastic film layer, the laminate having a proximate base portion substantially free of the conductors and adapted to be mounted to an actuator with the mounting plate, a distal portion adapted to mount a slider electrically connected to the conductors, and a spring portion extending in a plane between the proximate and distal portions; and a stiffener fixed to the distal portion forward of the spring portion in opposing relation, the stiffener having a proximate edge opposite the mount plate distal edge, the metal layer defining between the proximate and distal edges a first region that extends in a plane generally parallel with the spring portion plane and having substantially the length and width of the spring portion, the first region defining a first discontinuity whereby the subassembly is substantially free of the metal layer within the first region; the metal layer defining a second region contiguous and substantially coplanar with and distal to the first region and oppositely adjacent and generally parallel with the stiffener, the second region defining a second discontinuity that is a continuation of the first region discontinuity whereby the subassembly is substantially free of the metal layer within the second region, the subassembly moving independently of the metal layer at first and second discontinuities, said subassembly moving in response to backbending of the metal layer in an arc through the metal layer at the discontinuities therein rather than stretching fully over the arc of the bent metal layer as a function of the presence of the first and second discontinuities in the metal layer opposite the subassembly to lessen any change in the intended gram load resultant from stretching of the plastic film layer in the subassembly.

In its method aspects the invention provides the method of limiting gram load changes in a disk drive suspension comprising a suspension laminate of a metal layer and a subassembly of a plastic film and a plurality of conductors that has a base portion, a spring portion and a distal portion, including defining a discontinuity in the metal layer of the spring portion sized to pass the subassembly in the bent condition of the metal layer away from said subassembly through the plane of the spring portion, and passing the subassembly through the discontinuity chordally to the arc of the bent spring portion against stretching of the plastic film along the arc and thereby changing the gram load of the suspension.

Typically, the method also includes defining one or both of a second and third discontinuity in the metal layer distal portion and base portion respectively that is contiguous with the spring portion discontinuity, and passing the subassembly through the spring portion and the distal portion discontinuities chordally to the arc of the spring portion against stretching of the plastic film along the arc and thereby changing the gram load of the suspension, and further stiffening the distal portion with the stiffener.

BRIEF DESCRIPTION OF THE SEVERAL VIEWS OF THE DRAWINGS

The invention will be further described in conjunction with the attached drawings in which:

FIG. 4 is a plan view of a further embodiment;

FIG. 4A is a side elevation view thereof;

FIG. 4B is a view taken on line 4B–4B in FIG. 4

FIG. 5 is a plan view of a further embodiment;

FIG. 5A is a side elevation view thereof;

FIG. 5B is a view taken on line 5B–5B in FIG. 5;

DETAILED DESCRIPTION OF THE INVENTION

It has been found that an increase in the length of the center hole in a flexible circuit type suspension spring portion, to extend in or through and beyond the spring portion and into the base portion or distal, rigid portion of the suspension, effects a great reduction in stiffness, but remarkably a very small if any reduction in torsion, measured as torsional stiffness. In addition, there is no need to change the geometry of the stiffener. A suspension having a spring section with no cutout or hole is the stiffest in the vertical direction as well as in torsion. Modeling data demonstrate that adding a hole to the spring portion only will, in a given case, effect a 12.5% reduction in vertical stiffness, at the cost of a 1.7% reduction in torsion. The invention use of a larger hole, one that extends through the spring portion and into the rigid or distal portion, e.g. is about doubled in longitudinal extent from its extent through the spring portion, will effect a 17.8% reduction in vertical stiffness, and only a 1.9% reduction in torsion, that is the additional 5.3% of vertical stiffness reduction (17.8−12.5=5.3) is obtained at a cost of 0.2% reduction in torsion (1.9−1.7=0.2). The ratio of vertical stiffness reduction to torsion reduction is vastly increased over systems employing only a spring portion discontinuity or cut-out. In the example just given, the added 5.3% decrement in vertical stiffness was achieved with just a 0.2% decrement in torsion added, a ratio of 25.6 to 1.

In contrast, the spring portion only aperturing had a ratio of 7.35 to 1 in stiffness decrease to torsion decrease. Additional data appears hereinafter. Thus the invention provides in this example a more than three times greater unit change in vertical stiffness for each unit change in torsion over spring portion only aperturing. The aperture can be an enclosed figure, see FIG. 1, or a forwardly open or rearwardly open aperture, see FIGS. 5 and 6, respectively.

Figure 1:
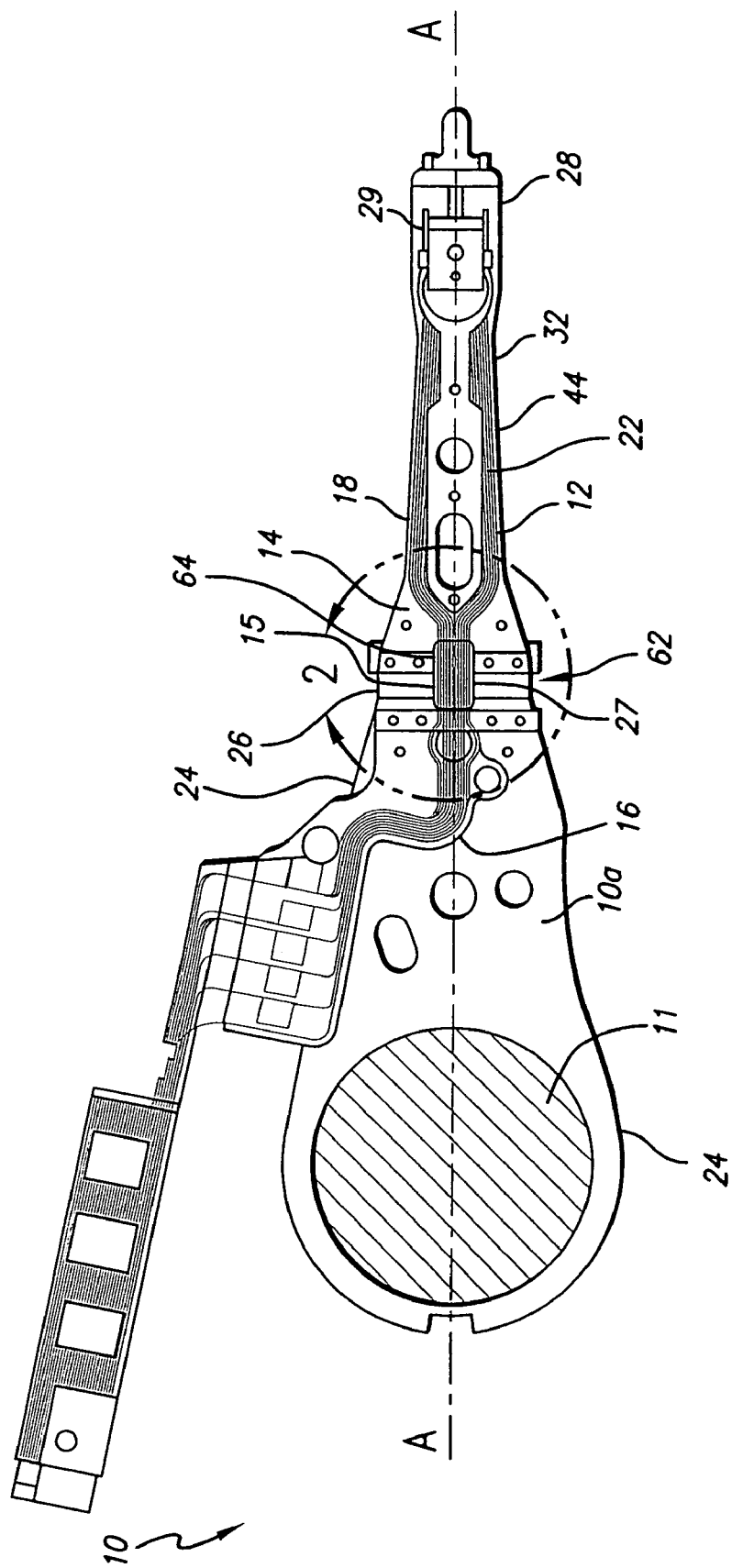
FIG. 1 is a plan view of the invention suspension.
Figure 2:
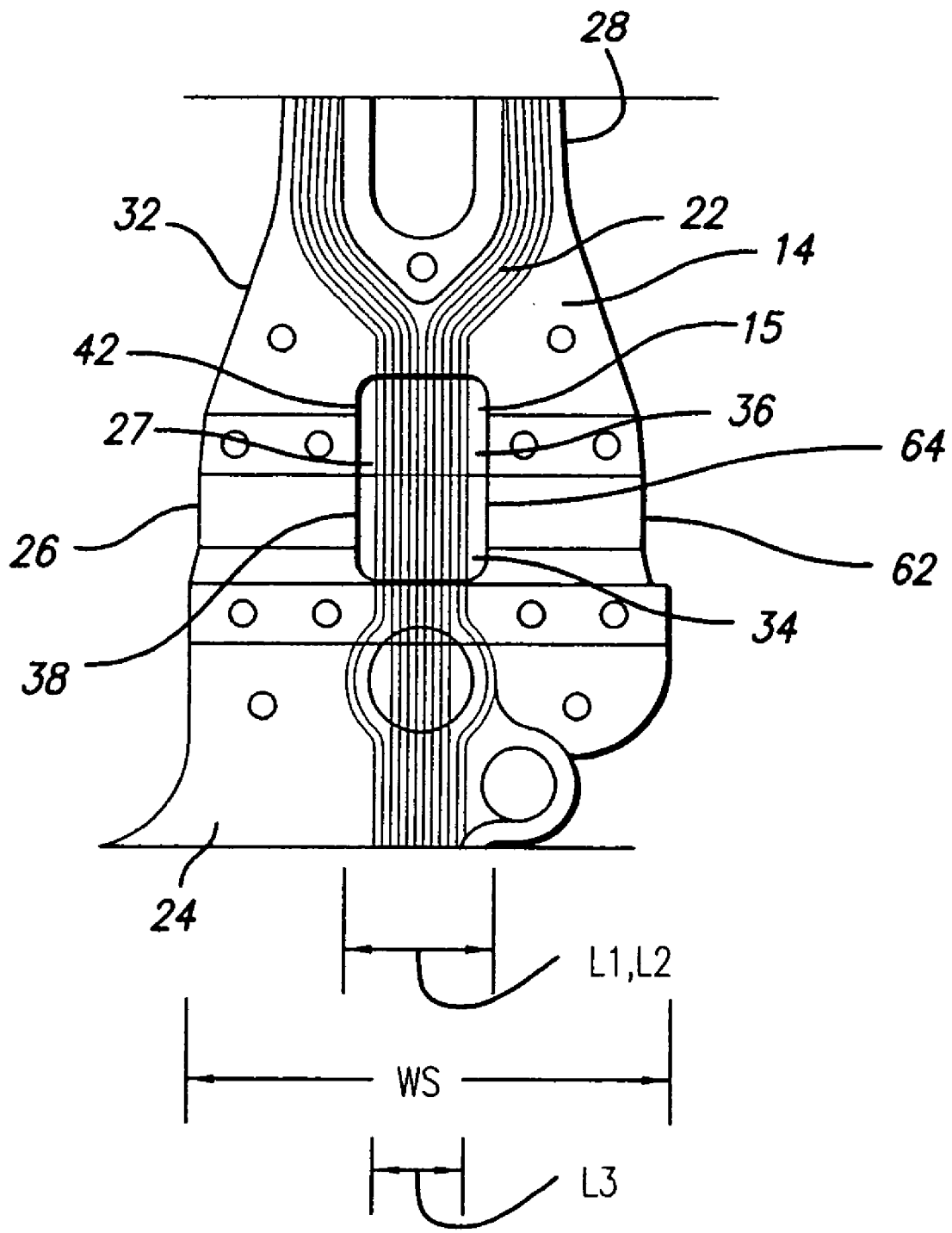
FIG. 2 is a fragmentary view taken on line 2 in FIG. 1.

With reference now to the drawings, and with particular reference to FIGS. 1–3, the invention low stiffness, high torsion disk drive suspension 10 is shown in a unimount version where the suspension connects directly to the actuator shaft 11 without use of an arm or mount plate. Suspension 10 comprises a load beam plate 10a attached to the actuator 11. A laminate 12 of a metal layer 14 and a subassembly 16 is fixed to the load beam plate 10a. Subassembly 16 comprises a plastic film layer 18 and a plurality of conductors 22 and is typically adhered to the metal layer 14, the laminate 12 being supported by the base plate 10a.

Metal layer 14 of the laminate 12 has a base portion 24, a spring portion 26 and a distal portion 28 that forms a flexure 29. Suspension 10 further comprises a stiffener 32 fastened to the laminate metal layer distal portion 28. Stiffener 32 is generally congruent with the opposing part 44 of the distal portion 28, as shown.

Load beam plate 10a and stiffener 32 are spaced longitudinally as shown on either side of the suspension spring portion 26. Suspension 10 has spring portion 26 and the suspension flexure 29, both defined by the laminate metal layer 14 as is characteristic of a so-called unibeam suspension.

Figure 3A:
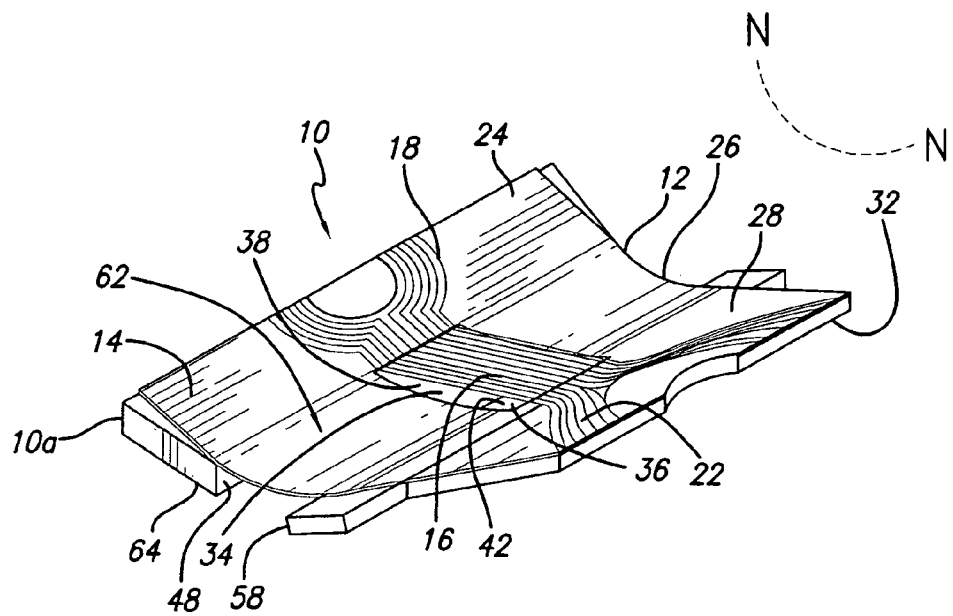
FIG. 3A is a fragmentary, oblique view of the suspension with a normal bend for a given gram load, at rest.
Figure 3B:
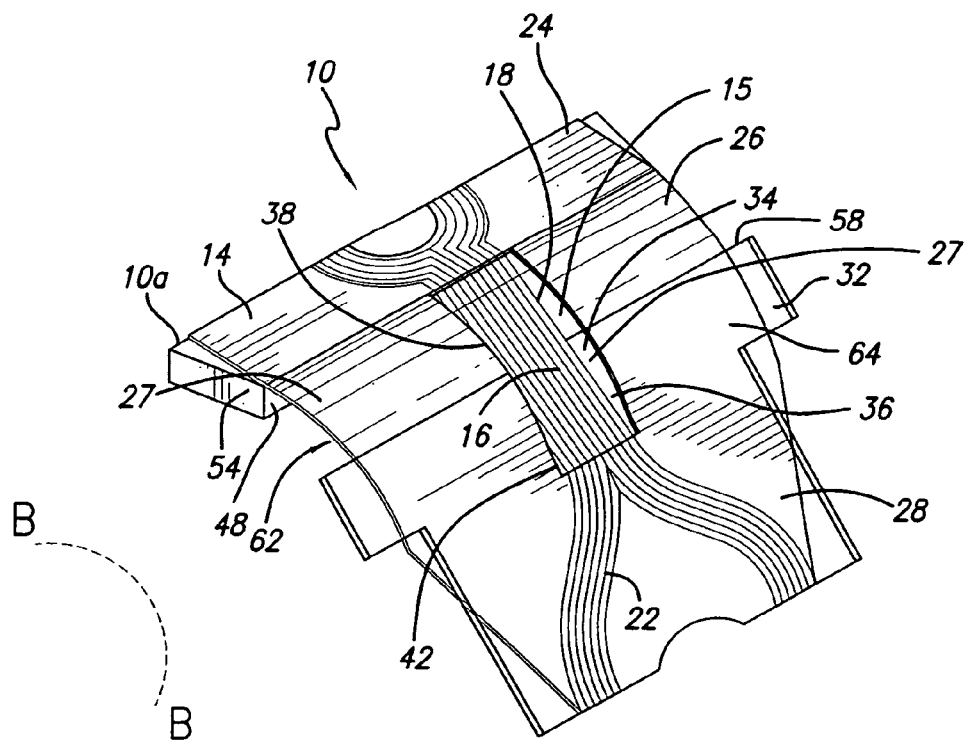
FIG. 3B is a view like FIG. 3A showing the backbending of the suspension in FIG. 3A.

Spring portion 26 has a normal arcuate bend along plane N—N, see FIG. 3A. When back bent, see FIG. 3B, the spring portion 26 takes on a reverse bend along an arcuate plane B—B. Metal layer 14 has aperturing 15 to be locally discontinuous in the spring portion 26. Aperturing 15 is generally opposite the plastic film 18 and traces 22 laminate subassembly 16. Aperturing 15 is located and sized to permit the subassembly 16 to pass through the plane B—B of the spring portion 26 upon back bending of the spring portion. By passing into the gap 27 provided by aperturing 15 rather than lying atop the back bent spring portion 26 and traversing the full arc B—B of the spring portion, the subassembly 16 does not undergo the arc B—B and there is no, or less, stretching in the plastic film layer 18. The absence or reduction in plastic film 18 stretching eliminates or decreases changes in the intended gram load normally resultant from stretching distortion of the plastic film layer.

To provide the passageway for the suspension subassembly 16 to pass through the arcuate plane B—B of the reversely bent and thus arcuate metal layer 14 at spring portion 26, aperturing 15 defines a hole 34 in the spring portion and a continuation hole 36 of the hole 34 in the distal portion 28. See FIG. 3B.

Holes 34 and 36 are formed by aperture 15 so that the metal layer 14 is locally discontinuous at 38 in the spring portion 26 and at 42 in the distal portion 28. The discontinuities 38, 42 and thus holes 34, 36 are contiguous and open to each other, each being a continuation of the other. In general, a typical hole 34, 36 will together be about 1.5 to 4 times as long as wide, and preferably about twice as long as wide, and, as noted below, will be rectangular, as shown, or of different specific shapes to have uniform or varying widths along their length, with edges that are straight or curved.

Typically in the invention suspension 10, the metal layer 14 comprises stainless steel about 0.00098 inch thick, the plastic film layer 18 comprises a polyimide film about 0.00065 inch thick, the stiffener 32 comprises a stainless steel member of greater thickness than the metal layer distal portion at about 0.00400 inch thick, and there may be a cover layer of resin, not shown, that may be about 0.00032 inch thick. The conductors 22 are traces generally about 0.00071 inch thick.

The locally discontinuous metal layer 14 defines in the spring portion 26 the first discontinuity 38 to have a lateral extent L1 equal to about 35% to about 70% of the lateral extent or width WS of the spring portion. This width is suitably uniform throughout the length of the discontinuity 38, or the discontinuity can be varied in width at the distal or proximate ends thereof, and/or at a locus between the ends, relatively more closely adjacent the distal end or the proximate end of the discontinuity, or intermediate the ends. Such extensions of the lateral width WS of the discontinuity 38 are themselves generally uniform in length and width, although this can be varied in particular cases.

The locally discontinuous metal layer 14 defines in the distal portion 28 the second discontinuity 42 to have a lateral extent L2 substantially the same as the first discontinuity 38. First and second discontinuities 38, 42 are shown centered on the metal layer 14 longitudinal axis A—A, with the subassembly 16 being centered on the metal layer longitudinal axis and having a lesser lateral extent L3 than the lateral extent L1, L2 of the first and second discontinuities 38, 42, respectively. It will be noted further that stiffener 32 is not reshaped to conform to the discontinuities 38 or 42, but, as positioned, opposes the second discontinuity. Stiffener 32 is located on a side of the suspension 10 such that its presence does not interfere with the subassembly 16 passing through the arcuate plane B—B, as previously explained.

Stiffener 32 is fixed to the distal portion 28 forward of the spring portion 26 in opposed or underlying relation, as shown, to be away from the subassembly that enters the discontinuity 42. As noted, spring portion 26 before backbending extends in a normally curved arcuate plane N—N between the proximate base portion 24 and distal portion 28. Stiffener proximate edge 58 lies opposite the load beam plate 10a distal edge 48. Metal layer 14 defines between these proximate and distal edges 48, 58 a first region 62 having substantially the length and width of the spring portion 26. This first region 62 defines the first discontinuity 38 whereby the subassembly 16 is substantially free of the metal layer 14 within the first region. Metal layer 14 also defines a second region 64 contiguous with, substantially coplanar with, and distal to the first region 62 and oppositely adjacent the stiffener 32. The second region 64 defines the second discontinuity 42 as a continuation of the first region discontinuity 38, whereby the subassembly 16 is substantially free of the metal layer 14 within the second region.

Subassembly 16 moves independently of the metal layer 14 in the first and second discontinuities 38, 42, so that, as stated, in response to backbending of the metal layer in an arc plane B—B from normal arcuate plane N—N, the subassembly moves through the metal layer at the discontinuities therein rather than stretching fully over the arc of the bent metal layer as a function of the presence of the first and second discontinuities in the metal layer opposite the subassembly to lessen any change in the intended gram load resultant from stretching of the plastic film layer in the subassembly.

FIGS. 4, 4A and 4B, in which like numerals indicate like parts to the FIGS. 1–3 embodiment, show suspension 104 in a non-unimount embodiment. The suspension is fixed by a mounting plate 46 to an actuator arm 52 that is operated by an actuator not shown. Mounting plate 46 is generally rectangular and has a distal edge 48 and a central boss 49 adapted to interfit with an aperture 50 in actuator arm 52, the mounting plate being typically weld-attached to the suspension base portion 54. As in the previous embodiment, laminate 12 comprises metal layer 14 and the subassembly 16, the subassembly being comprised of plastic film layer 18 and a plurality of conductors 22 separated from the metal layer by the plastic film layer. In this embodiment, the laminate metal layer 14 defines a proximate base portion 54 free of the film 18 and the conductors 22 and mounted to actuator arm 52 by the mounting plate 46. Metal layer 14 further provides the distal portion 28 that is adapted to mount a slider 56 to be electrically connected to the conductors 22. The invention suspension 104 further preferably includes a stiffener 32 attached as by welding, gluing or the like, to the laminate distal portion 28.

Laminate metal layer 14 has aperturing 15 to be locally discontinuous in the spring portion 26, thus to permit the subassembly 16 to pass through the plane P—P of the spring portion upon bending of the laminate 12. See FIGS. 3A, 3B. As in the first embodiment, the aperturing 15 enables the subassembly 16 to not undergo the arc of the metal layer 14 when the suspension 10 is bent. None, or less, stretching in the plastic film layer 18 eliminates or decreases changes in the intended gram load resultant from distortion of the plastic film layer, as described above for the FIGS. 1–3 first embodiment.

In FIGS. 5, 5A and 5B, a further embodiment is shown in which like parts to the FIGS. 1–4 embodiments have like numerals plus 500. In this embodiment, suspension 105 has laminate 512 supported by a load beam 31. A stiffener 532 reinforces the laminate metal layer 514 distal portion 528. Aperturing 515 extends rearwardly from the spring portion 526 into the metal layer portion above the load beam 31 and into adjacency with the mount plate 546, but not into the distal portion 528 as in the previous embodiments. Of course, the aperturing 515 can extend in both directions from the spring portion 526 if desired. Thus, with reference now to these FIGS. the invention low stiffness, high torsion disk drive suspension is shown at 105 and comprises a laminate 512 of a metal layer 514 and a subassembly 516 comprising a plastic film layer 518 and a plurality of conductors 522. Laminate 512 has a base portion 554, a spring portion 526 and a distal portion 528. Laminate metal layer 514 has aperturing 515 to be locally discontinuous in the spring portion 526, thus to permit the subassembly 516 to pass through the spring portion upon bending of the laminate 512 and enable the subassembly 516 to not undergo the arc of the metal layer 514 when the suspension 105 is bent. None, or less, stretching in the plastic film layer 518 eliminates or decreases changes in the intended gram load resultant from distortion of the plastic film layer.

To provide the passageway for the suspension subassembly 516 to pass through the reversely bent and thus arcuate metal layer 514 at spring portion 526, a hole 534 is provided in the spring portion and a continuation hole 537 of that hole in the metal layer proximal portion 539 generally in the manner of the FIGS. 1–3 embodiment described above. Thus, holes 534 and 537 are formed by having the metal layer 514 apertured to be locally discontinuous at 538 in the spring portion 526 and at 543 in the layer proximal portion 539. The discontinuities 538, 543 and thus holes 534, 537 are contiguous and each a continuation of the other. In general, a typical hole 534, 537 will be about 1.5 to 4 times as long as wide, and preferably about twice as long as wide, as noted below.

Figure 6:
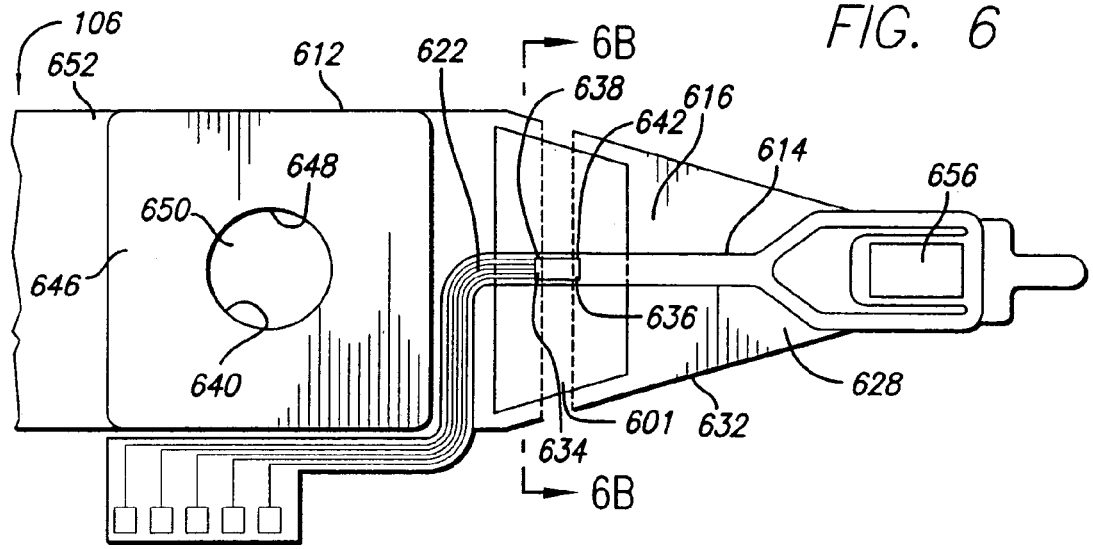
FIG. 6 is a plan view of a further embodiment.
Figure 6A:
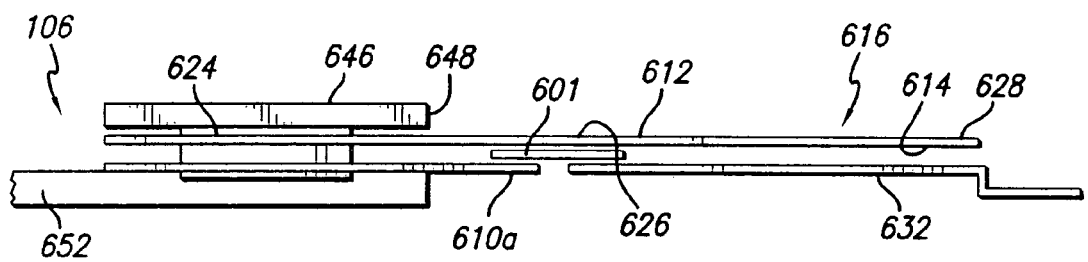
FIG. 6A is a side elevation view thereof.
Figure 6B:
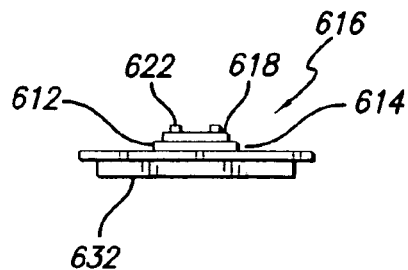
FIG. 6B is a view taken on line 6B–6B in FIG. 6.

In FIGS. 6, 6A and 6B, a further embodiment is shown in which like parts to the FIGS. 1–5 embodiments have like numerals plus 600. In this embodiment, suspension 106 has the metal layer 614 of the laminate 612 is supported by a load beam plate 610a and a stiffener 632 that are connected by a separately formed spring section 601. Thus, with particular reference to FIGS. 6, 6A and 6B, the invention low stiffness, high torsion disk drive suspension is shown at 106 and comprises a laminate 612 of a metal layer 614 and a subassembly 616 comprising a plastic film layer 618 and a plurality of conductors 622. Laminate 612 has a base portion 624, a distal portion 628 and a separately formed spring section 601 spaced from and generally parallel with the laminate 612. Laminate metal layer 614 has aperturing 615 to be locally discontinuous in the spring portion 626, thus to permit the subassembly 616 to pass through the plane of the metal layer 614 upon bending of the laminate 612. This enables the subassembly 616 to not undergo the arc of the metal layer 614 when the suspension 610 is bent. None, or less, stretching in the plastic film layer 618 eliminates or decreases changes in the intended gram load resultant from distortion of the plastic film layer.

As in previous embodiments, to provide for the suspension subassembly 616 passing through the arcuate plane of the reversely bent and thus arcuate metal layer 614, a hole 634 is provided in the metal layer and a continuation hole 636 of that hole in the distal portion 628. See FIG. 6B.

Holes 634 and 636 are formed by having the metal layer 614 apertured to be locally discontinuous at 638 and at 642 in the distal portion 628. The discontinuities 638, 642 and thus holes 634, 636 are contiguous and each a continuation of the other. In general, a typical hole 634, 636 will be about 1.5 to 4 times as long as wide, and preferably about twice as long as wide, as noted below.

In its method aspects, and with reference to FIGS. 1–3 as typical, the invention provides a method of limiting gram load changes in disk drive suspension 10 including in a suspension laminate 12 of a metal layer 14 and a subassembly 16 of a plastic film 18 and a plurality of conductors 22 that has a base portion 24, a spring portion 26 and a distal portion 28 defining a discontinuity 38 in the metal layer of the spring portion sized to pass the subassembly in the bent condition of the metal layer through the plane of the metal layer, and passing the subassembly through the discontinuity chordally to the arc of the bent metal layer against stretching the plastic film along the arc and thereby changing the gram load of the suspension.

The method further includes defining discontinuity 42 in the in the metal layer 14 of the distal portion 28 (or, in FIG. 5 in the proximal portion 539) that is contiguous with the spring portion discontinuity 538, and passing the subassembly through the spring portion and the distal portion discontinuities chordally to the arc of the bent metal against stretching the plastic film along the arc and thereby changing the gram load of the suspension, and maintaining attached to the distal portion a stiffener 32, and stiffening the distal portion with the stiffener.

In the following Table, the results of modeling and actual measurements on a suspension according to the invention are shown. The suspension had the construction noted above (cf. FIGS. 1–3 embodiment), and had a centered hole 34 measuring 0.026 inch wide in both the Prior Art and Invention cases, and 0.025 inch long in the Prior Art case and 0.048 long in the Invention case. Metal layer width was constant; subassembly 16 width was constant.

TABLE

|  | Case 1 | | Case 2 | | Case 3 | |
| --- | --- | --- | --- | --- | --- | --- |
|  | Modeled | measured | Modeled | measured | Modeled | measured |
| First Torsion, Hz | 6590 | 7067 | 6480 |  | 6467 | 6736 |
| Normalized | 1.000 | 1.000 | 0.983 |  | 0.981 | 0.953 |
| Vertical stiffness, N/m | 13.10 | 15.38 | 11.47 |  | 10.78 | 9.33 |
| Normalized | 1.000 | 1.000 | 0.875 |  | 0.822 | 0.607 |
| Sway mode, Hz |  | 9676 |  |  |  | 10057 |
| Normalized |  | 1.000 |  |  |  | 1.039 |
| Backbend @ 1 mm, gmf |  | 0.14 |  |  |  | 0.08 |
| Normalized |  | 1.000 |  |  |  | 0.571 |
| Backbend @ 2 mm, gmf |  | 0.31 |  |  |  | 0.18 |
| Normalized |  | 1.000 |  |  |  | 0.581 |

The modeled and measured data differ slightly, with the measured data showing an increased advantage for the invention, Case 3. Specifically, there is a 39.3% improvement (decrease) in vertical stiffness vs. only a 4.7% degradation (decrease) in torsion. This result is accompanied by a 3.9% improvement in sway resonant frequency and an improvement in gram load change as well. As previously noted, the effect of backbending is how much of the preset (intended) gram load force is lost by lifting the suspension away from the disk by some distance such as 1 or 2 mm. At the lower 1 mm. backbend, the invention has a 62.9% improvement over the no hole case, Case 1, (decrease in gram load change), and at 2 mm. backbend a 42.9% improvement over the no hole case, Case 1.

The invention thus provides a suspension design in which the ratio of sought-after vertical stiffness reduction to unwanted torsion reduction is about 8 to 1 or better depending on the amount of backbend.

The invention thus provides, more generally, a suspension that eliminates or greatly reduces the amount of lost torsion for each increment in stiffness reduction and in which the change in intended gram load is minimized through the utilization of the same suspension structure that provides the better ratio of torsion loss/stiffness decrease. The invention provides a suspension in which there is a hole or discontinuity in the spring portion carrying on to the distal portion of the suspension that enables decrease in suspension stiffness at little or no loss in torsion. The discontinuity further acts to allow the plastic film part of the suspension laminate to avoid stretching with the metal layer part of the laminate during backbending of the suspension by passing through the discontinuity instead of bending arcuately with the metal layer. The problem of the stretched plastic film changing the suspension intended gram load is thus avoided.

The foregoing objects are thus met.

I claim:

1. Low stiffness, high torsion disk drive suspension having an intended gram load and comprising a laminate having a proximate part and a distal part, said laminate comprising a plastic film layer and a plurality of conductors, and a support for said laminate comprising a base portion, a spring portion and a distal portion, said spring portion having a local discontinuity to permit said laminate to pass through the plane of said spring portion upon bending of said support, whereby stretching of said plastic film and resultant change in intended gram load is limited.

2. The low stiffness, high torsion disk drive suspension according to claim 1, in which said support comprises stainless steel.

3. The low stiffness, high torsion disk drive suspension according to claim 1, in which said plastic film layer comprises a polyimide film.

4. The low stiffness, high torsion disk drive suspension according to claim 1, in which said support distal portion defines a stiffener.

5. The low stiffness, high torsion disk drive suspension according to claim 4, in which said stiffener is generally congruent with the opposing part of said laminate.

6. The low stiffness, high torsion disk drive suspension according to claim 1, in which said discontinuity is a first discontinuity, said first discontinuity having a longitudinal extent substantially equal to the length of said spring portion and a lateral extent equal to about 35% to about 70% of the lateral extent of said spring portion.

7. The low stiffness, high torsion disk drive suspension according to claim 1, in which said laminate has a distal portion and a base portion, said laminate further comprises a metal layer, said discontinuity is a first discontinuity, said laminate metal layer defining one or both of a second and third discontinuity in said laminate distal portion and said laminate base portion respectively, said discontinuities each being contiguous with said first discontinuity, each having a longitudinal extent not greater than the longitudinal extent of said spring portion, and each having a lateral extent equal to about 35% to about 70% of the width of said spring portion.

8. The low stiffness, high torsion disk drive suspension according to claim 7, in which each of said discontinuities is centered on said metal layer longitudinal axis, said subassembly being centered on said metal layer longitudinal axis and having less lateral extent than said discontinuities.

9. A method of limiting gram load changes in a disk drive suspension comprising a support and a laminate of a plastic film and a plurality of conductors, said support having a base portion, a spring portion and a distal portion, including defining a discontinuity in said spring portion sized to pass said laminate through the plane of said spring portion in a bent condition, and passing said laminate through said discontinuity chordally to the arc of said bent spring portion against stretching of said plastic film along said arc and thereby changing the gram load of said suspension.

10. The method according to claim 9, including also defining one or both of a second and third discontinuity in said support distal portion and base portion respectively that is contiguous with said spring portion discontinuity, and passing said subassembly through said spring portion and said base and distal portion discontinuities chordally to the arc of said spring portion against stretching of said plastic film along said arc and thereby changing the gram load of said suspension.

11. The method according to claim 10, including also stiffening said distal portion with a stiffener.

* * * * *